US008355397B2

(12) United States Patent
Arai et al.

(10) Patent No.: US 8,355,397 B2
(45) Date of Patent: Jan. 15, 2013

(54) MOBILE BODY-MOUNTED COMMUNICATION APPARATUS AND ADDRESS MANAGEMENT APPARATUS

(75) Inventors: Kunimitsu Arai, Tokyo (JP); Shigeyuki Asami, Tokyo (JP); Kouji Kashima, Tokyo (JP); Eiji Niwa, Aichi-ken (JP); Yoshichika Konishi, Aichi-ken (JP)

(73) Assignees: Japan Radio Co., Ltd., Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 590 days.

(21) Appl. No.: 12/627,316

(22) Filed: Nov. 30, 2009

(65) Prior Publication Data

US 2010/0074245 A1 Mar. 25, 2010

Related U.S. Application Data

(63) Continuation of application No. PCT/JP2008/059782, filed on May 28, 2008.

(30) Foreign Application Priority Data

May 31, 2007 (JP) ................................. 2007-144822
May 31, 2007 (JP) ................................. 2007-144823

(51) Int. Cl.
  *H04J 1/16* (2006.01)
  *H04L 12/56* (2006.01)
(52) U.S. Cl. ......................... 370/389; 370/252; 370/278
(58) Field of Classification Search .................. 370/252, 370/278, 389
See application file for complete search history.

(56) References Cited

U.S. PATENT DOCUMENTS

| 2005/0105524 | A1* | 5/2005 | Stevens et al. ................ 370/389 |
| 2006/0212549 | A1* | 9/2006 | Hokkyo et al. ............... 709/220 |
| 2007/0026858 | A1 | 2/2007 | Mizukoshi |

FOREIGN PATENT DOCUMENTS

| JP | 2006325019 | 11/2006 |
| JP | 2007043259 | 2/2007 |

OTHER PUBLICATIONS

English Translation of Office Action issued in connection with corresponding Chinese Patent Application No. 200880018004.5 mailed on Dec. 14, 2010.
Korean Office Action issued on Apr. 13, 2011 in connection with KR Application No. 2009-7024672 and English translation thereof.

* cited by examiner

*Primary Examiner* — John Pezzlo
(74) *Attorney, Agent, or Firm* — Gesmer Updegrove LLP

(57) ABSTRACT

A mobile body-mounted communication device mounted in a mobile body such as a vehicle and making difficult the long-time tracking of the moving path of the mobile body. The mobile body-mounted communication device mounted in a mobile body and used for transmitting/receiving packet information is characterized by comprising a borrowing address acquiring section for acquiring lending addresses as borrowed addresses from an address management device managing lending addresses, a borrowing time information acquiring section for acquiring information representing predetermined times during which the borrowing addresses can be used from the address management device, and a transmitting section for transmitting packet information including information on a borrowing address out of the borrowing addresses and the mobile body during the predetermined borrowing times determined for the borrowing addresses.

11 Claims, 9 Drawing Sheets

FIG. 2

| MANAGEMENT ADDRESS | USE CONDITION INFORMATION | LENDING TERM INFORMATION |
|---|---|---|
| 5R4X | LENT | 10:00, SEPTEMBER 15, 2007 |
| AQR2 | LENT | 10:00, SEPTEMBER 15, 2007 |
| ⋮ | ⋮ | ⋮ |
| | | |
| | ⋮ | ⋮ |
| L87U | UNUSED | |
| H6HD | UNUSED | |
| RDV3 | UNUSED | |
| ⋮ | ⋮ | ⋮ |
| | | |
| ⋮ | ⋮ | ⋮ |

MOBILE BODY-MOUNTED COMMUNICATION APPARATUS AND ADDRESS MANAGEMENT APPARATUS

PRIORITY INFORMATION

The present application is a continuation of International Application No. PCT/JP2008/059782 filed May 28, 2008 which claims priority to Japanese Patent Application No. 2007-144822, filed on May 31, 2007 and Japanese Patent Application No. 2007-144823, filed on May 31, 2007, all of which are incorporated herein by reference in their entireties.

TECHNICAL FIELD

The present invention relates to a mobile body-mounted communication apparatus which, being mounted on a mobile body, transmits packet information including information relating to the mobile body, and an address management apparatus which assigns an address to the mobile body-mounted communication apparatus.

BACKGROUND ART

A vehicle-to-vehicle communication system including a plurality of vehicle-mounted communication apparatus, each of which is mounted on a vehicle, wherein the plurality of vehicle-mounted communication apparatus transmit and receive packet information to and from each other, is widely known. The vehicle-mounted communication apparatus transmits packet information including information relating to the vehicle mounted therewith, causing an address assigned to the relevant vehicle-mounted communication apparatus to be included as a transmission source address. Another vehicle-mounted communication apparatus which has received the packet information, based on the transmission source address included therein, identifies the vehicle-mounted communication apparatus which has transmitted the packet information, and acquires the information relating to the vehicle mounted with the identified vehicle-mounted communication apparatus. The other vehicle-mounted communication apparatus, in the event of transmitting another item of packet information with the vehicle-mounted communication apparatus which has transmitted the packet information as a destination, transmits packet information in which the transmission source address included in the received packet information is caused to be included as a destination address.

Patent Document 1: JP-A-2006-325019

DISCLOSURE OF THE INVENTION

Problems that the Invention is to Solve

In this way, a transmission source address for identifying a vehicle-mounted communication apparatus which has transmitted the packet information is included in packet information used in the vehicle-to-vehicle communication system. It is also conceivable that, in order to identify the vehicle-mounted communication apparatus which has transmitted the packet information, it is preferable to constantly set an address uniquely assigned to the vehicle-mounted communication apparatus as the transmission source address.

However, in the event that the address uniquely assigned to the vehicle-mounted communication apparatus is used as the transmission source address, by detecting a position of a vehicle-mounted communication apparatus which transmits packet information including the same transmission source address, it becomes easy to track a path of traveling of a vehicle for a long period exceeding a time period necessary to carry out communication. This is liable to invade the privacy of a user of the vehicle.

The invention has been conceived in response to this kind of problem. That is, an object is, in a mobile body-mounted communication apparatus mounted on a mobile body such as a vehicle, and an address management apparatus which assigns an address to the mobile body-mounted communication apparatus, to make it difficult to track a path of movement of the mobile body for a long period.

Means for Solving the Problems

The invention is a mobile body-mounted communication apparatus which, being mounted on a mobile body, transmits and receives packet information, characterized by including a borrowed address acquisition unit which acquires a plurality of lent addresses, as a borrowed address group, from an address management apparatus which manages the lent addresses; a borrowing time period information acquisition unit which acquires, from the address management apparatus, information indicating borrowing time periods defined as time periods for which the borrowed address group can be used; and a transmitting unit which transmits the packet information, which includes borrowed addresses included in the borrowed address group and information relating to the mobile body, for the borrowing time periods determined for the borrowed address group.

Also, in the mobile body-mounted communication apparatus according to the invention, it is preferable that it includes a requested borrowing time period determination unit which determines time periods for which the plurality of lent addresses are to be borrowed as the borrowed address group; and an address request unit which transmits address request information which makes a request that the plurality of lent addresses be assigned for the time periods determined by the requested borrowing time period determination unit, wherein the borrowed address acquisition unit acquires the plurality of lent addresses, as the borrowed address group, from the address management apparatus which has responded to the address request information, and the borrowing time period information acquisition unit acquires the information indicating the borrowing time periods from the address management apparatus which has responded to the address request information.

Also, the invention is an address management apparatus which assigns an address to a mobile body-mounted communication apparatus mounted on a mobile body, characterized by including a lent address storage unit which stores a lent address to be assigned to the mobile body-mounted communication apparatus; and a borrowing information supply unit which supplies the mobile body-mounted communication apparatus a lent address group including a plurality of the lent addresses, and information indicating lending time periods for which the lent address group is assigned to the mobile body-mounted communication apparatus, wherein the lent address group is assigned to the mobile body-mounted communication apparatus for the lending time periods determined for the lent address group.

Also, in the address management apparatus according to the invention, it is preferable that it includes an address request information acquisition unit which acquires, from the mobile body-mounted communication apparatus, address request information indicating time periods for which the lent address group is to be assigned; and a lending time period determination unit which, based on the time periods indicated by the address request information, determines the lending time periods.

Also, in the address management unit according to the invention, it is preferable that the lending information supply unit includes lending time period determination means which, based on a frequency of assigning the lent address group to the mobile body-mounted communication apparatus, determines the lending time periods.

Also, in the address management apparatus according to the invention, it is preferable that the address management apparatus is provided fixed in an area in which the mobile body moves.

Also, the invention is an address management apparatus which, being provided fixed in an area in which a mobile body moves, assigns an address to a mobile body-mounted communication apparatus, characterized by including a lent address storage unit which stores a lent address to be assigned to the mobile body-mounted communication apparatus; and a lending information supply unit which supplies the mobile body-mounted communication apparatus the lent address and information indicating a lending time period for which the lent address is assigned to the mobile body-mounted communication apparatus, wherein the lent address is assigned to the mobile body-mounted communication apparatus for a lending time period determined for the lent address.

Also, in the address management apparatus according to the invention, it is preferable that it includes an address request information acquisition unit which acquires, from the mobile body-mounted communication apparatus, address request information indicating a time period for which the lent address is to be assigned; and a lending time period determination unit which, based on the time period indicated by the address request information, determines the lending time period.

Also, in the address management apparatus according to the invention, it is preferable that the lending information supply unit includes lending time period determination means which, based on a frequency of assigning the lent address to the mobile body-mounted communication apparatus, determines the lending time period.

Also, the invention is a mobile body-mounted communication apparatus which, being mounted on a mobile body, transmits and receives packet information, characterized by including a borrowed address acquisition unit which acquires a lent address, as a borrowed address, from an address management apparatus which manages the lent address; a borrowing time period information acquisition unit which acquires, from the address management apparatus, information indicating a borrowing time period defined as a time period for which the borrowed address can be used; and a transmitting unit which transmits the packet information, which includes the borrowed address and information relating to the mobile body, for the borrowing time period determined for the borrowed address.

Also, in the mobile body-mounted communication apparatus according to the invention, it is preferable that it includes a requested borrowing time period determination unit which determines a time period for which the lent address is to be borrowed as the borrowed address; and an address request unit which transmits address request information which makes a request that the lent address be assigned for the time period determined by the requested borrowing time period determination unit, wherein the borrowed address acquisition unit acquires the lent address, as the borrowed address, from the address management apparatus which has responded to the address request information, and the borrowing time period information acquisition unit acquires the information indicating the borrowing time period from the address management apparatus which has responded to the address request information.

Also, the invention is an address management apparatus which assigns an address to a mobile body-mounted communication apparatus mounted on a mobile body, characterized by including a lent address storage unit which stores a lent address to be assigned to the mobile body-mounted communication apparatus; and a lending information supply unit which supplies the mobile body-mounted communication apparatus the lent address and information indicating a lending time period for which the lent address is assigned to the mobile body-mounted communication apparatus, wherein the lent address is assigned to the mobile body-mounted communication apparatus for the lending time period determined for the lent address.

Also, in the address management apparatus according to the invention, it is preferable that it includes an address request information acquisition unit which acquires, from the mobile body-mounted communication apparatus, address request information indicating a time period for which the lent address is to be assigned; and a lending time period determination unit which, based on the time period indicated by the address request information, determines the lending time period.

Also, in the address management unit according to the invention, it is preferable that the lending information supply unit includes lending time period determination means which, based on a frequency of assigning the lent address to the mobile body-mounted communication apparatus, determines the lending time period.

Advantage of the Invention

According to the invention, it is possible to realize a mobile body-mounted communication apparatus for which it is difficult to track a path of movement for a long period.

BRIEF DESCRIPTION OF THE DRAWINGS

FIG. 2 A diagram showing a configuration of a management table;

DESCRIPTION OF REFERENCE NUMERALS AND SYMBOLS

10 Address server, 12 Roadside wireless device, 14C Vehicle, 14 and 42 Vehicle-mounted communication apparatus, 18 and 28 Receiving unit, 20 and 30 Transmitting unit, 22 Management address storage unit, 24 Server side address management unit, 26 Antenna, 32 Unique address storage unit, 34 Borrowed address storage unit, 36 Own address storage unit, 38 Vehicle-mounted side address management unit, 40 Packet information processing unit, 44 Address management unit.

BEST MODE FOR CARRYING OUT THE INVENTION

Figure 1:
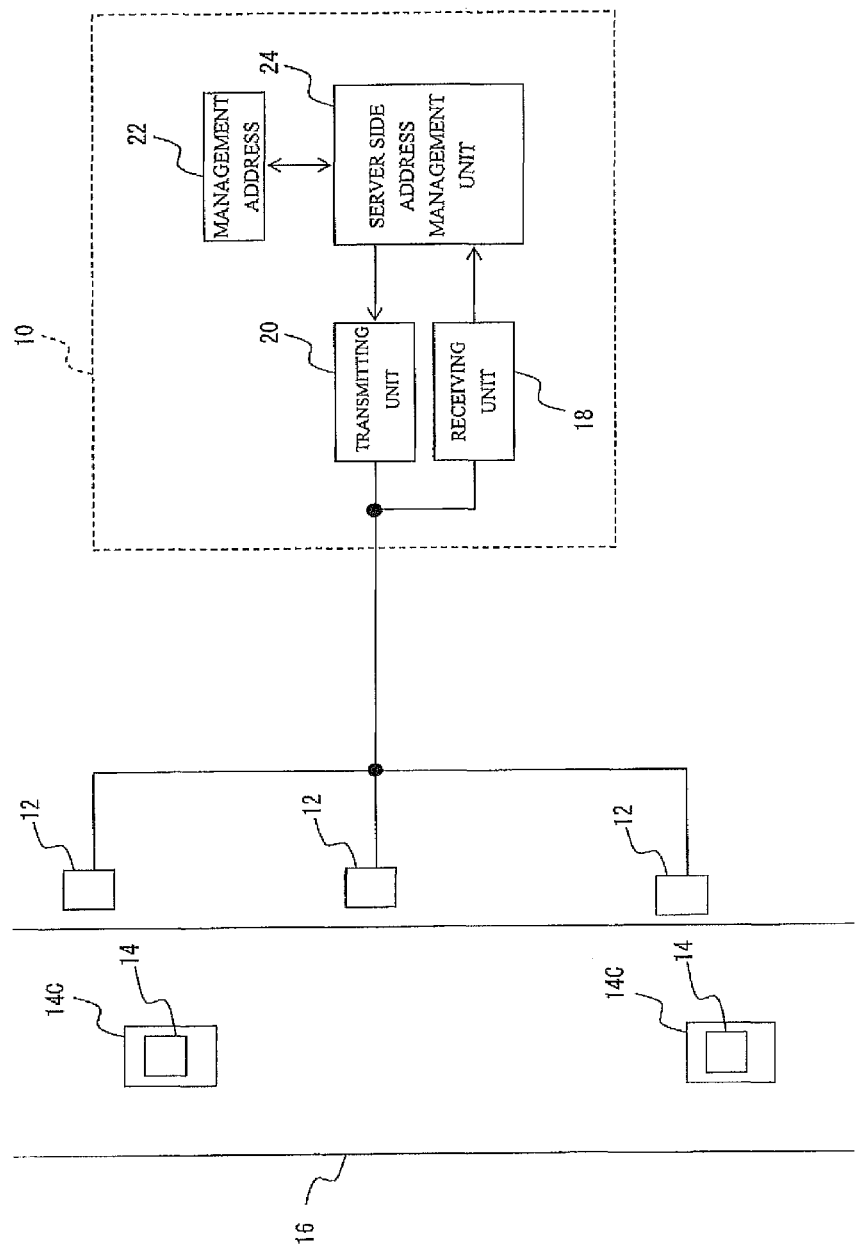
FIG. 1 A diagram showing a configuration of a vehicle-to-vehicle communication system.

A configuration of a vehicle-to-vehicle communication system according to an embodiment of the invention is shown in FIG. 1. The vehicle-to-vehicle communication system is configured including an address server 10, roadside wireless devices 12, vehicles 14C, and vehicle-mounted communication apparatus 14. The number of roadside wireless devices 12 provided is plural. The roadside wireless devices 12, being wire connected to the address server 10, are spaced at regular intervals along a road 16. The roadside wireless devices 12 acquire from the address server 10, and transmit, information including addresses which the vehicle-mounted communication apparatus 14 use for communication. The vehicle-mounted communication apparatus 14, being mounted one on each vehicle 14C, carry out transmission and reception of packet information using the addresses acquired from the roadside wireless devices 12.

The address server 10 is configured including a receiving unit 18, a transmitting unit 20, a management address storage unit 22, and a server side address management unit 24.

The address server 10 manages a plurality of management addresses as addresses to be assigned to the vehicle-mounted communication apparatus 14. The address server 10 transmits information including the management addresses to the vehicle-mounted communication apparatus 14, via the roadside wireless devices 12, and allows them to use the management addresses as their own addresses for them to be identified by the vehicle-to-vehicle communication system.

Information indicating whether or not the management addresses are used is registered in a management table which the management address storage unit 22 stores. A configuration of the management table is shown in FIG. 2. In the management table, an identifier of either "lent" or "unused" is correlated to the management addresses. Furthermore, lending term information indicating terms for which the management addresses are used by the vehicle-mounted communication apparatus 14 is correlated to the management addresses to which the identifier "lent" is correlated as use condition information. In the example of FIG. 2, the identifier "lent" is correlated to management addresses "5R4X" and "AQR2", while the identifier "unused" is correlated to management addresses "L87U", "H6HD", and "RDV3". Also, "10:00, Sep. 15, 2007" and "10:23, Sep. 15, 2007" are correlated respectively to the management addresses "5R4X" and "AQR2" as the lending term information. Information relating to a sufficient number of management addresses to allow the vehicle-mounted communication apparatus 14 configuring the vehicle-to-vehicle communication system to use the addresses is registered in the management table.

Figure 3:
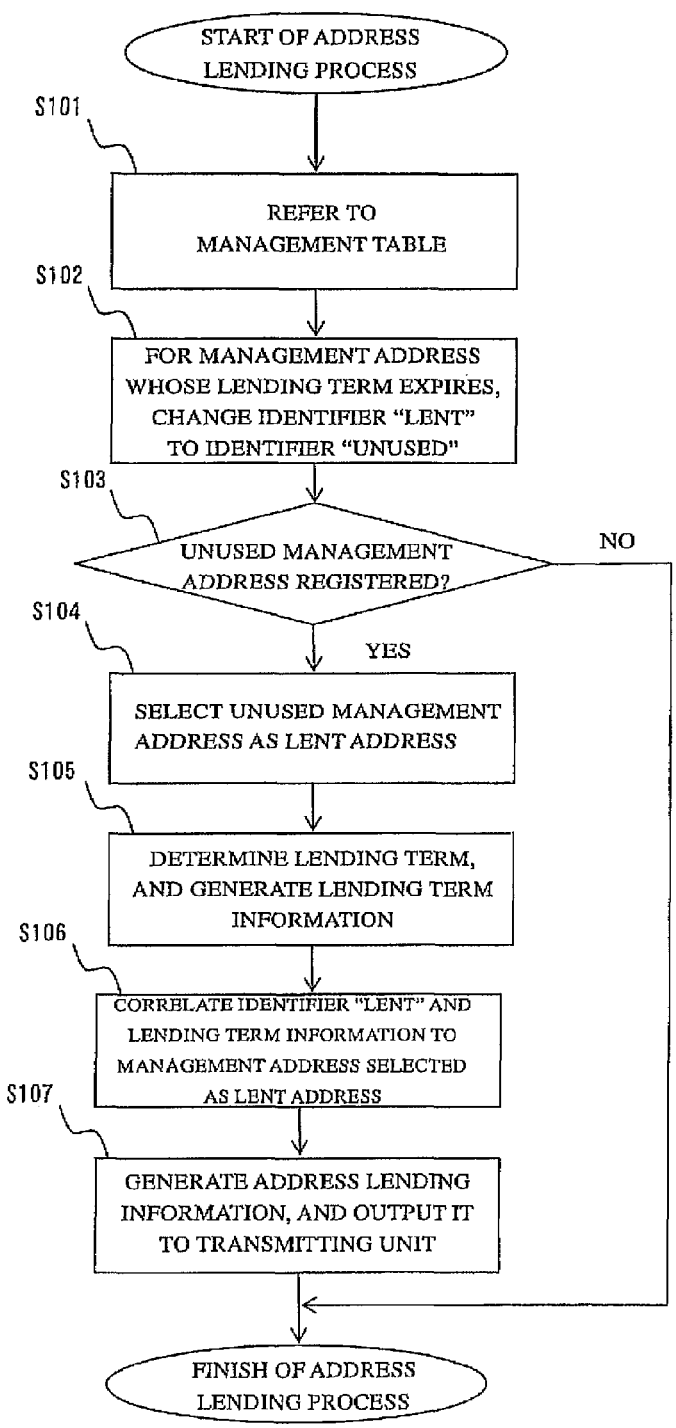
FIG. 3 A flowchart of an address lending process.

A description will be given of an address lending process wherein the address server 10 transmits a management address to the vehicle-mounted communication apparatus 14 as a lent address. A flowchart of the address lending process is shown in FIG. 3.

The address lending process is started by acquiring address request information transmitted from the vehicle-mounted communication apparatus 14 configuring the vehicle-to-vehicle communication system. The address request information includes information indicating the fact that an address lending is to be requested, an own address for identifying the vehicle-mounted communication apparatus 14 which has transmitted the relevant address request information, a requested address quantity indicating the number of addresses requested to be lent, and information indicating a requested lending term determined by the vehicle-mounted communication apparatus 14 as a term for which a lent address is assigned.

The roadside wireless device 12 receives address request information from the vehicle-mounted communication apparatus 14, and transmits it to the address server 10. The receiving unit 18 receives the address request information, and outputs it to the server side address management unit 24. The server side address management unit 24, on acquiring the address request information, refers to the management table (S101).

When the lending term of a management address to which the identifier "lent" is correlated has expired, the server side address management unit 24 changes the identifier "lent" to the identifier "unused" (S102).

The server side address management unit 24 determines whether or not a management address, among the management addresses registered in the management table, to which the identifier "unused" is correlated is registered as the use condition information (S103). Then, when no management address to which the identifier "unused" is correlated is registered, the server side address management unit 24 finishes the address lending process.

Meanwhile, when a management address to which the identifier "unused" is correlated is registered as the use condition information, the server side address management unit 24 selects the management address, to which the identifier "unused" is correlated, as the lent address (S104). Herein, the number of lent addresses selected is taken to be the requested address quantity. When the number of management addresses to which the identifier "unused" is correlated is smaller than the requested address quantity, the server side address management unit 24 selects all of the management addresses to which the identifier "unused" is correlated, as the lent addresses.

The server side address management unit 24 determines a lending term, and generates lending term information indicating the lending term (S105). It is possible, based on the information indicating the requested lending term included in the acquired address request information, to determine the lending term to be the same term as the requested lending term.

The server side address management unit 24 correlates the identifier "lent", and the lending term information generated in step S105, to the management address which has been made the lent address, and registers them in the management table (S106). In the event that a plurality of management addresses are selected as the lent addresses, common lending term information is correlated to each management address.

The server side address management unit 24 generates address lending information which includes an address included in the address request information as a destination address, and which includes the lent address and lending term information, and outputs it to the transmitting unit 20 (S107). The transmitting unit 20 transmits the address lending information to the roadside wireless device 12 which is a source of transmission of the address request information. The relevant roadside wireless device 12 transmits the address lending information acquired from the address server 10.

According to this kind of process, when management addresses in an unused condition are registered in the management table, in the event that the number of these kinds of management address is equal to or larger than the requested address quantity, a number of management addresses the same as the requested address quantity are selected, and in the event that the number of these kinds of management address is smaller than the requested address quantity, all of the management addresses in the unused condition are selected, as lent addresses for the vehicle-mounted communication apparatus 14 which is an address request source. Lending terms are then determined for the lent addresses selected. By transmitting the address lending information including the lent addresses and lending term information, it is possible to allow the vehicle-mounted communication apparatus 14 which has acquired the address lending information to acquire and use the lent addresses. Also, the lending term information is registered in the management table in step S106. Because of this, under the condition that the vehicle-mounted communication apparatus 14 which has acquired the address lending information finishes the use of the lent address within the lending term, when the lending term has expired, it is possible to cancel a lent condition without carrying out communication with the relevant vehicle-mounted communication apparatus 14 for confirming that the lending term has expired.

As the address request information, a description has been given here of the information including the requested address quantity. By presetting the number of addresses requested by one address lending process to be a predetermined quantity, for example, one, it is possible, as the address request information, to use information which does not include the requested address. In this case, in the process of step S104, one management address is selected as the lent address.

Also, as the address request information, a description has been given here of a case in which the information including the information indicating the requested lending term has been acquired. The address lending process can also be executed in a case in which the address request information which does not include the information indicating the requested lending term has been acquired.

In this case, the server side address management unit 24 determines the lending term in such a way that a time period from the current time to an expiration time of the lending term has a sufficient length for the vehicle-mounted communication apparatus 14 which is the address request source to carry out transmission and reception of the packet information, and is a time period short enough that it is difficult to track a path of movement of the vehicle-mounted communication apparatus 14 which is the address request source.

Also, it is preferable to make a time period until the lending term expires more shortly the higher a frequency of assigning management addresses to the vehicle-mounted communication apparatus 14. For example, in the management table, the lending term is determined in such a way that, the larger the number of management addresses to which the identifier "lent" is correlated, the shorter the time period until the lending term expires. Also, it is acceptable to determine the lending term in such a way that the larger the number of requested addresses, the shorter the time period until the lending term expires, and it is also acceptable to determine the lending term in such a way that a frequency of the address request information being acquired is measured, and that the higher the frequency, the shorter the time period until the lending term expires. Furthermore, it is also acceptable for an apparatus which counts the number of vehicles existing within a predetermined distance from the roadside wireless device 12 which is the source of transmission of the address request information to be mounted on the relevant roadside wireless device 12, and for the lending term to be determined in such a way that the larger the number of vehicles counted, the shorter the time period until the lending term expires. By determining the lending term in this way, it is possible to assign a large number of management addresses within a certain time period.

Furthermore, apart from determining the lending term in this way, it is also acceptable to check an average value of time periods for which a vehicle is driven, that is, of time periods from turning on an ignition until turning it off, over a plurality of times of driving, based on statistics on general vehicles, and to determine a lending term in advance based on the average value.

Also, it is acceptable in step S104, when the number of management addresses to which the identifier "unused" is correlated exceeds the requested address quantity, to execute a process of preferentially selecting a management address, whose time period for which it is placed in the unused condition is long, as the lent address. In this case, in the management table, a process is executed wherein a time period which has elapsed from when the identifier "unused" has been correlated to the management address is correlated to a management address to which the identifier "unused" is correlated, and the time period is registered in the management table every time the address lending process is executed. Also, it is acceptable in step S104, when the number of management addresses to which the identifier "unused" is correlated exceeds the requested address quantity, to execute a process of preferentially selecting management addresses which have been put into "lent" a few times. In this case, in the management table, a process is executed wherein the number of times the identifier "lent" has been correlated thereto is correlated to the individual management addresses, and the number of times is updated every time step S104 is executed. According to this kind of process, the individual management addresses registered in the management table are equally assigned to the vehicle-mounted communication apparatus 14, and it is possible to increase the kinds of address used in the vehicle-to-vehicle communication system within a certain time period. By this means, it is possible to make it more difficult to track the vehicle-mounted communication apparatus 14.

Figure 4:
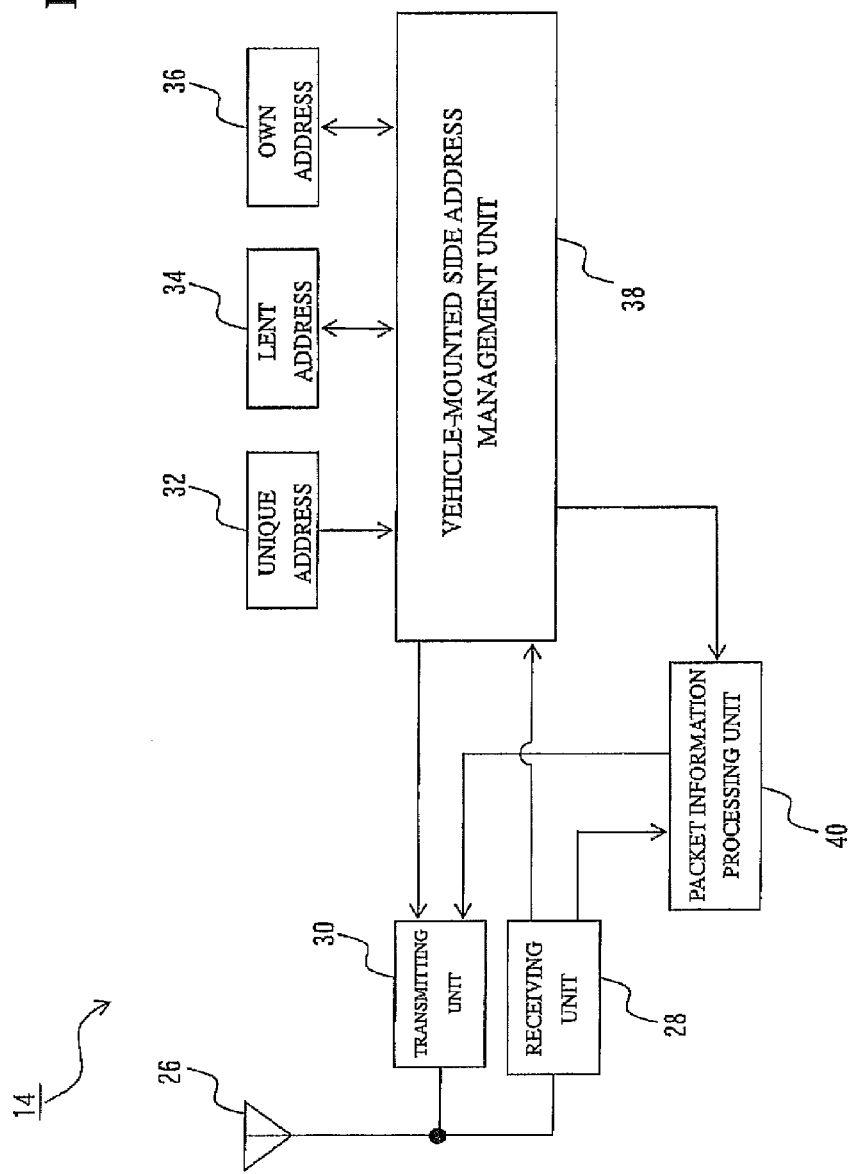
FIG. 4 A diagram showing a configuration of a vehicle-mounted communication apparatus.

Next, a description will be given of the vehicle-mounted communication apparatus 19. A configuration of the vehicle-mounted communication apparatus 14 is shown in FIG. 4. The vehicle-mounted communication apparatus 14 is configured including an antenna 26, a receiving unit 28, a transmitting unit 30, a unique address storage unit 32, a borrowed address storage unit 34, an own address storage unit 36, a vehicle-mounted side address management unit 38, and a packet information processing unit 40. Each component will be described together with a function of the vehicle-mounted communication apparatus 14 and a process executed by the vehicle-mounted communication apparatus 14.

A unique address is assigned to the vehicle-mounted communication apparatus 14 as a unique address for communication. The unique address is stored in the unique address storage unit 32.

The vehicle-mounted communication apparatus 14 acquires a lent address transmitted from the address server 10, via the roadside wireless device 12, as a borrowed address, and applies the borrowed address as its own address for it to be identified in the vehicle-to-vehicle communication system.

Figure 5:
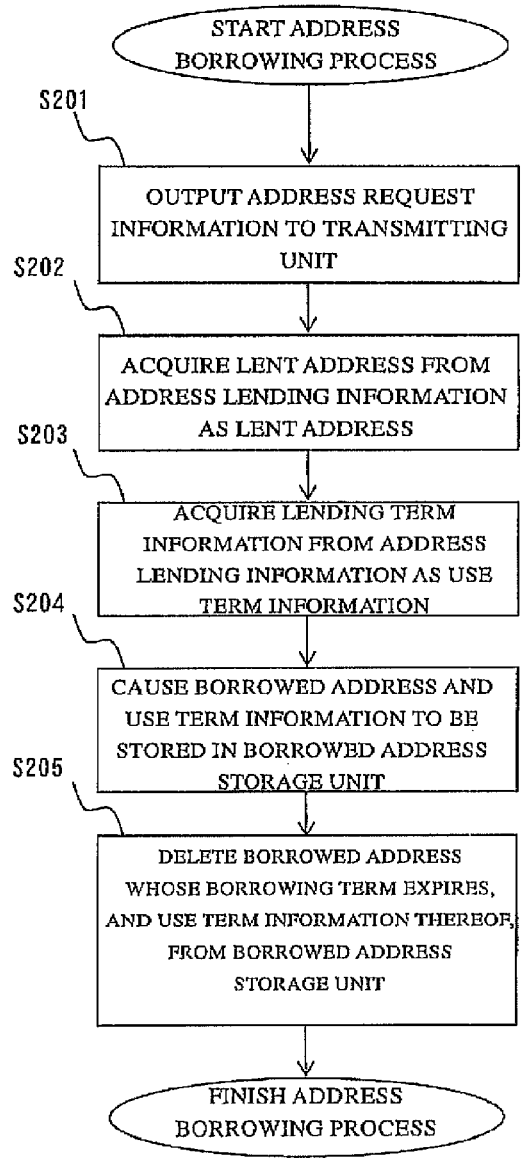
FIG. 5 A flowchart of an address borrowing process.

A description will be given of an address borrowing process wherein the vehicle-mounted communication apparatus 14 acquires a borrowed address. A flowchart of the address borrowing process is shown in FIG. 5. It is taken that the address borrowing process is executed when a condition is reached in which no borrowed address is stored in the borrowed address storage unit 34. Apart from this, it is also acceptable to execute the address borrowing process every time a vehicle mounted with the vehicle-mounted communication apparatus 14 travels a predetermined distance.

The vehicle-mounted side address management unit 38 generates address request information in which own addresses stored in the own address storage unit 36 are caused to be included by an own address setting process to be described hereafter. Furthermore, the vehicle-mounted side address management unit 38, as well as determining terms, for which borrowed addresses are to be used, to be the requested lending terms, determines the requested address quantity. Then, the vehicle-mounted side address management unit 38 causes information indicating the requested address quantity and requested lending terms to be included in the address request information.

In the event that the number of addresses requested in one address borrowing process is preset, and that it is possible for the address server 10 to execute the address lending process for the address request information which does not include the requested address, it is acceptable not to cause the requested address quantity to be included in the address request information.

In the same way, in the event that it is possible for the address server 10 to execute the address lending process for the address request information which does not include the information indicating the requested lending terms, it is acceptable not to cause the information indicating the requested lending terms to be included in the address request information.

The requested lending term is determined in such a way that a time period from the current time to an expiration time of the requested lending term has a sufficient length for the vehicle-mounted communication apparatus 14 to carry out transmission and reception of the packet information, and is a time period short enough that it is difficult to track the path of movement of the vehicle-mounted communication apparatus 14. For example, the vehicle-mounted side address management unit 38 acquires in advance an average value of time periods for which a vehicle mounted with vehicle-mounted communication apparatus 14 is driven, that is, of time periods from turning on an ignition until turning it off, over a plurality of times of driving, and determines the time periods to be of around the average value.

Also, it is preferable that the requested lending term is determined in such a way that, the smaller the number of other vehicles around the vehicle mounted with the vehicle-mounted communication apparatus 14, the longer the time period until the relevant requested lending term expires. For example, an apparatus such as a car navigation apparatus which counts the number of other vehicles existing within a predetermined distance from the vehicle mounted with the vehicle-mounted communication apparatus 14 is mounted on the vehicle-mounted communication apparatus 14, and the requested lending term is determined in such a way that, the smaller the number of other vehicles counted, the longer the time period until the requested lending term expires. By determining the requested lending term in this way, in the event that the number of vehicles which, appearing in the vicinity of the roadside wireless device 12, are mounted with the vehicle-mounted communication apparatus 14 is small, it is possible to extend the requested lending term, and lengthen a period for which the borrowed address can be used.

The requested address quantity is taken to be, for example, a quantity which is larger the longer the time period until the requested lending term expires. Also, in the same way as the requested lending term, it is acceptable for the requested address quantity to be determined in such a way that, the smaller the number of other vehicles around the vehicle mounted with the vehicle carrying the vehicle-mounted communication apparatus 14, the larger a quantity it becomes. By determining the requested address quantity in this way, it is possible to increase the requested address quantity, and acquire and use a large number of kinds of borrowed address, in the event that the number of vehicles appearing in the vicinity that are mounted with the vehicle-mounted communication apparatus 14s is small.

The vehicle-mounted side address management unit 38 outputs the generated address request information to the transmitting unit 30 (S201). The transmitting unit 30 transmits the address request information via the antenna 26.

Address lending information is transmitted from the address server 10, which has acquired the address request information and responded to it, by the address lending process. The receiving unit 28 receives the address lending information via the antenna 26, and outputs it to the vehicle-mounted side address management unit 38.

The vehicle-mounted side address management unit 38 acquires a lent address included in the address lending information as a borrowed address (S202). Also, it acquires lending term information included in the address lending information as use term information (S203). The vehicle-mounted side address management unit 38 causes the borrowed address and use term information to be stored in the borrowed address storage unit 34 (S204). Herein, in the event that a plurality of lent addresses are included in the address lending information, the vehicle-mounted side address management unit 38 acquires the individual lent addresses as the borrowed addresses, and causes them to be stored in the borrowed address storage unit 34 with the use term information thereof correlated to each borrowed address. In the address lending information, in the event that common lending term information is correlated to the plurality of lent addresses, the individual borrowed addresses are stored after the same use term information is correlated to them. When the use terms of the borrowed addresses stored in the borrowed address storage unit 34 expire, the vehicle-mounted side address management unit 38 deletes the borrowed addresses and the use term information thereof from the borrowed address storage unit (S205).

According to steps S201 to S204, the borrowed addresses and use term information are acquired from the received address lending information, and stored in the borrowed address storage unit 34. Also, according to step S205, it is possible to avoid the borrowed addresses whose use terms have expired being referred to by the vehicle-mounted side address management unit 38.

Even in the event that the number of addresses requested in one address borrowing process is set to be one, and one lent address is stored in the borrowed address storage unit 34 together with the use term information thereof, by executing the address borrowing process a plurality of times, it is possible to store a plurality of borrowed addresses in the borrowed address storage unit 34 together with each item of use term information.

Figure 6:
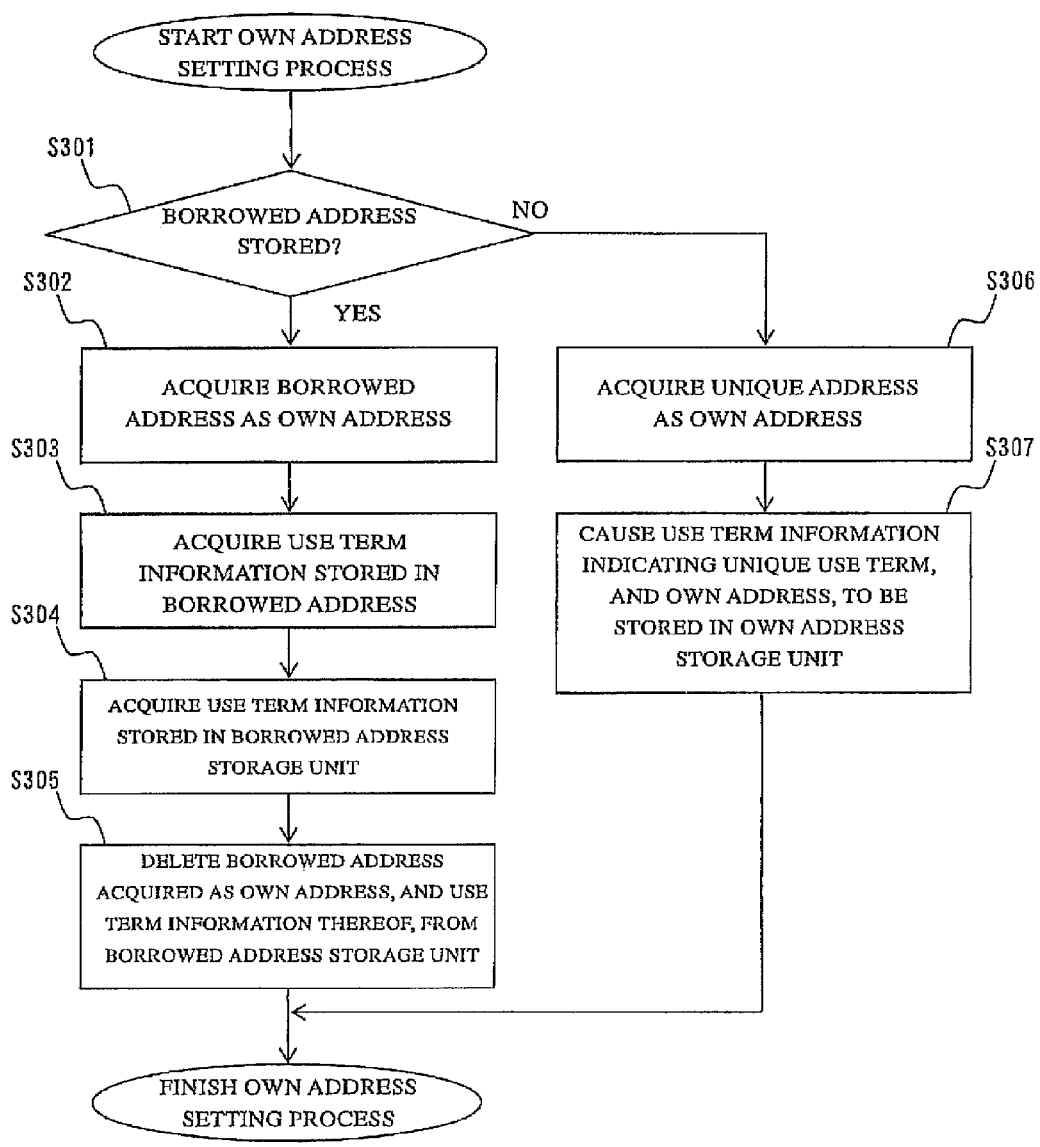
FIG. 6 A flowchart of an own address setting process.

A description will be given of an own address setting process wherein the vehicle-mounted side address management unit 38 determines an own address, and stores it in the own address storage unit 36. A flowchart of the own address setting process is shown in FIG. 6.

The vehicle-mounted side address management unit 38 refers to the use term information stored in the own address storage unit 36 and, at a predetermined time Δ1 before an expiration time of the use term indicated by the use term information, starts the own address setting process.

The vehicle-mounted side address management unit 38 determines whether or not a borrowed address is stored in the borrowed address storage unit 34 (S301).

When a plurality of borrowed addresses are stored, the vehicle-mounted side address management unit 38 acquires one of them as the own address, and when one borrowing address is stored, it acquires the borrowing address as the own address (S302). When a plurality of borrowing addresses whose use terms differ from one another are stored, it is preferable to preferentially select one which has a short time period until its use term expires. The vehicle-mounted side address management unit 38 further acquires use term information stored in the borrowed address storage unit 34 together with the borrowed address which has been made the own address (S303). The vehicle-mounted side address management unit 38 causes the own address and use term information to be stored in the own address storage unit 36 (S304). The vehicle-mounted side address management unit 38 deletes the borrowed address acquired as the own address, and the use term information thereof, from the borrowed address storage unit 34 (S305).

When no borrowed address is stored in the borrowed address storage unit 34, the vehicle-mounted side address management unit 38 acquires a unique address stored by the unique address storage unit 32 as the own address (S306).

Then, the vehicle-mounted side address management unit 38 causes the unique address to be stored in the own address storage unit 36 together with the use term information indicating a unique use term preset as a use term in the event that the unique address is used as the own address (S307).

According to this kind of process, when a borrowed address is stored in the borrowed address storage unit 34, the borrowed address is stored in the own address storage unit 36 as the own address, and when no borrowed address is stored in the borrowing address storage unit 34, a unique address is stored in the own address storage unit 36 as the own address.

In the event that a borrowed address is applied as the own address, the use term of the own address becomes the use term of the borrowed address. Then, the use term of the borrowed address is defined by the lending term information included in the address lending information. Because of this, in the event that the borrowed address is applied as the own address, a time period until the use term of the own address expires is a time period which has a sufficient length to carry out communication, and is short enough that it is difficult to track the path of movement of the vehicle-mounted communication apparatus 14.

Also, in step S302, when a plurality of borrowed addresses whose use terms differ from one another are stored, by preferentially selecting one which has a short time period until its use term expires, it is possible to make the number of borrowed addresses acquired as the own addresses within a certain time period as large as possible. By this means, it is possible to raise a frequency of the own address being changed within a certain time period, and it is possible to make it difficult to track the vehicle-mounted communication apparatus 14.

The own address setting process is executed every time a time comes which is the predetermined time Δ1 before a time when the use term for the own address stored in the own address storage unit 36 expires. Then, the borrowed address stored in the borrowed address storage unit 34 is changed by the address borrowing process being executed. By this means, the own address stored in the own address storage unit 36 is changed along with the expiration of the use term.

In the event that the requested address quantity is taken to be two or more, and that each of a plurality of lent addresses has been acquired as the borrowed address in step S202 of the address borrowing process, in step S203, the lending term information included in the address lending information is acquired as the use term information common to the plurality of borrowed addresses.

Figure 7:
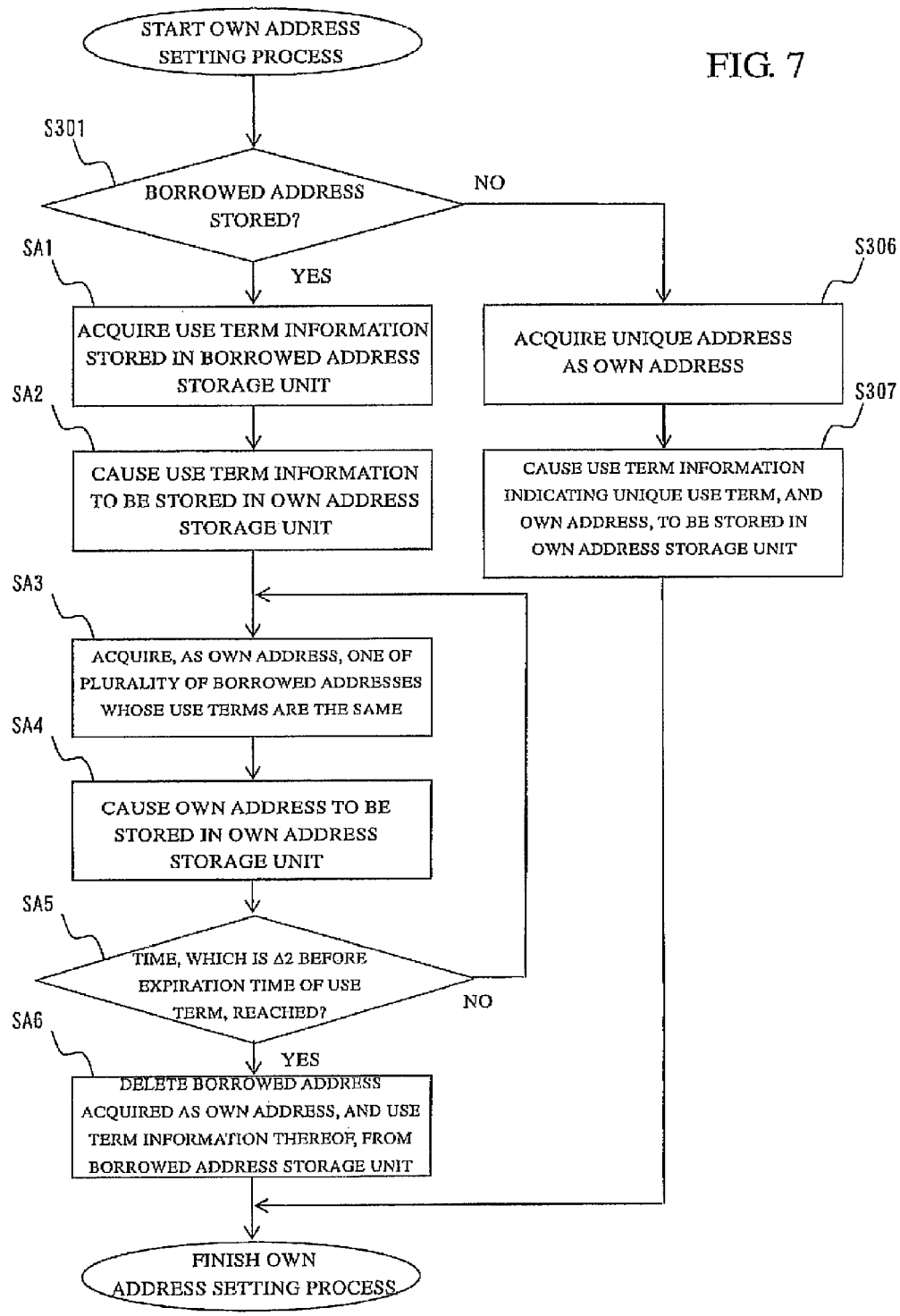
FIG. 7 A flowchart of an own address setting process according to an application example.

A description will be given, referring to the flowchart of FIG. 7, of the own address setting process according to an application example which the vehicle-mounted communication apparatus 14 executes in a case in which a plurality of borrowed addresses whose use terms are the same have been acquired. The same processes as the processes shown in the flowchart of FIG. 6 will be given identical reference characters and numerals, and a description thereof will be omitted.

When a plurality of borrowed addresses whose use terms are the same are stored in the borrowed address storage unit 34, the vehicle-mounted side address management unit 38 acquires use term information common thereto stored in the borrowed address storage unit 39 (SA1). The vehicle-mounted side address management unit 38 causes the use term information to be stored in the own address storage unit 36 (SA2).

The vehicle-mounted side address management unit 38 selects one of the plurality of borrowed addresses, whose use terms are the same, stored in the borrowed address storage unit 34, and acquires it as an own address (SA3). The vehicle-mounted side address management unit 38 causes the own address to be stored in the own address storage unit 36 (SA4).

The vehicle-mounted side address management unit 38 refers to the use term information stored in the own address storage unit 36, and determines whether or not a time which is a predetermined time Δ2 before an expiration time of the use term indicated by the use term information has been reached (SA5). It is taken here that the length of the predetermined time Δ2 is longer than the length of the heretofore described predetermined time Δ1.

When the time which is the predetermined time Δ2 before an expiration time of the use term indicated by the use term information has not been reached, the vehicle-mounted side address management unit 38 returns to step SA3. Meanwhile, when the time which is the predetermined time Δ2 before an expiration time of the use term indicated by the use term information has been reached, the vehicle-mounted side address management unit 38 deletes the plurality of borrowed addresses acquired in steps SA3 and SA4 as the own addresses, and the use term information thereof, from the borrowed address storage unit 34 (SA6), and finishes the own address setting process.

According to this kind of process, the process wherein one of the plurality of borrowed addresses is selected as the own address is repeated a plurality of times during the period from the own address setting process being started until it is finished. Herein, in step SA3, by taking it that one of the plurality of borrowed addresses is selected at random, it is possible to increase the uncertainty of the own address, and it is possible to make it difficult to track the path of movement of the vehicle-mounted communication apparatus 14.

Herein, by taking the time periods for which the borrowed addresses are stored as the own addresses to be differing time periods for each borrowed address, it is possible to make it more difficult to track the path of movement of the vehicle-mounted communication apparatus 14.

Figure 8:
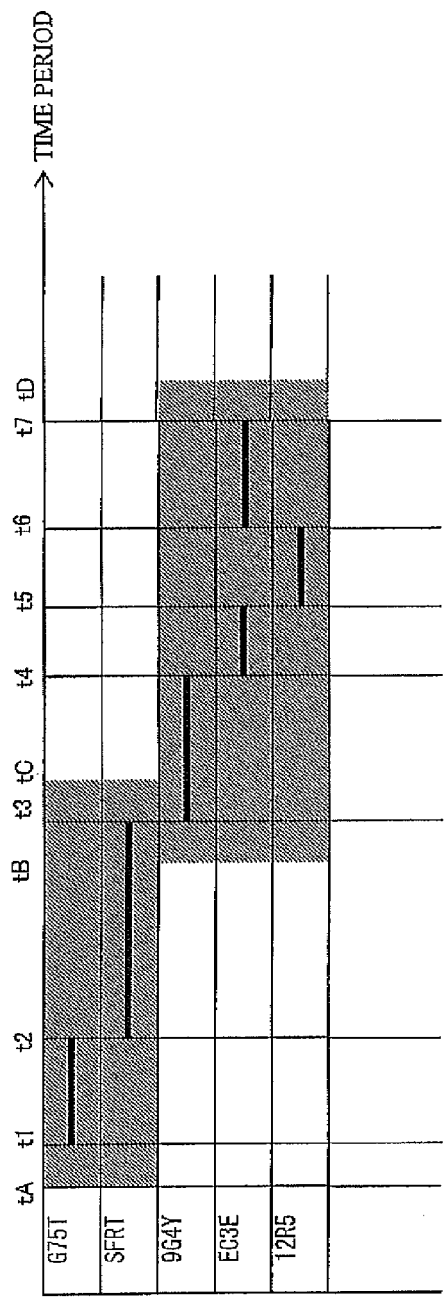
FIG. 8 A drawing showing a process of making time periods, in which borrowed addresses are stored as own addresses, different for each borrowed address.

FIG. 8 shows this kind of process with a diagram. The section at the left end shows borrowed addresses stored in the borrowed address storage unit 34, while the horizontal axis shows time periods. The hatching shows that, in the time period from a time tA to a time tC, borrowed addresses "G75T" and "SFRT" are stored in the borrowed address storage unit 34 as borrowed addresses whose use terms are the same, and in the time period from a time tB to a time tD, borrowed addresses "9G4Y", "EC3E", and "12R5" are stored in the borrowed address storage unit 34 as borrowed addresses whose use terms are the same. The thick solid lines of FIG. 8 show that, in the time period from a time t1 to a time t2, a borrowed address "G75T" is used as an own address, and in the time period from the time t2 to a time t3, a borrowed address "SFRT" is used as an own address. Then, the thick solid lines show that, in the time period from the time t3 to a time t4, a borrowed address "9G4Y" is used as an own address, in the time period from the time t4 to a time t5, a borrowed address "EC3E" is used as an own address, in the time period from the time t5 to a time t6, a borrowed address "12R5" is used as an own address, and in the time period from the time t6 to a time t7, a borrowed address "EC3E" is used as an own address.

Next, a description will be given of a process of the vehicle-mounted communication apparatus 14 transmitting and receiving the packet information. The vehicle-mounted side address management unit 38 acquires an own address stored in the own address storage unit 36, and outputs it to the packet information processing unit 40.

The packet information processing unit 40 generates packet information in which own addresses are caused to be included as transmission source addresses, and traveling information indicating a vehicle position, a moving speed, and the like are caused to be included as data to be transmitted. Apart from them, it is possible to cause optional information, such as text information, image information, moving image information, and sound information, which is wished to be transmitted to a passenger of a vehicle mounted with the vehicle-mounted communication apparatus 14 which is a transmission destination, to be included as the data to be transmitted. The packet information processing unit 40, in the event that it allows another specific vehicle-mounted communication apparatus 14 to acquire the packet information, or in the event that it causes the packet information to be transmitted in relay, causes an address for identifying the other vehicle-mounted communication apparatus 14 to be included in the packet information separately from the transmission source address. The packet information processing unit 40 outputs the generated packet information to the transmitting unit 30. The transmitting unit 30 transmits the packet information via the antenna 26.

The receiving unit 28 receives the packet information via the antenna 26, and outputs it to the packet information processing unit 40. The packet information processing unit 40 acquires the packet information from the receiving unit 28. Then, the packet information processing unit 40 extracts the transmission source address from the packet information, and identifies the vehicle-mounted communication apparatus 14 which has transmitted the packet information. Also, the packet information processing unit 40 extracts the data to be transmitted from the packet information, and acquires the traveling information of the vehicle mounted with the vehicle-mounted communication apparatus 14 which has transmitted the packet information. The packet information processing unit 40, based on the acquired traveling information, controls the running condition of the vehicle in such a way that a collision with another vehicle mounted with the vehicle-mounted communication apparatus 14 of the source of transmission of the packet information is avoided. Also, in the event that text information, image information, moving image information, sound information, and the like are included in the data to be transmitted of the packet information, these items of information are reproduced.

As heretofore described, in the event that a borrowed address is applied as an own address, the use term of the own address has a sufficient length for carrying out communication, and is a short enough time period that it is difficult to track the path of movement of the vehicle-mounted communication apparatus 14. Also, by the borrowed address stored in the borrowed address storage unit 34 being updated, the own address stored in the own address storage unit 36 is changed along with the expiration of the use term.

By this means, it is possible to change the own address, which is caused to be included in the packet information as the transmission source address, along with an elapse of time, and it is possible to avoid a traveling path of the vehicle mounted with the vehicle-mounted communication apparatus 14 being tracked for a long period. Furthermore, by acquiring a plurality of borrowed addresses, it is possible to increase the uncertainty of the own address, and it is possible to make it more difficult to track the path of traveling of the vehicle mounted with the vehicle-mounted communication apparatus 14.

Next, a description will be given of a vehicle-to-vehicle communication system according to the application example. In the heretofore described vehicle-to-vehicle communication system, the address server 10 executes the address lending process, and the vehicle-mounted communication apparatus 14 executes the address borrowing process. As opposed to this, in the vehicle-to-vehicle communication system according to the application example, the vehicle-mounted communication apparatus mounted on each vehicle executes both the address lending process and address borrowing process. By adopting this kind of system configuration, a need to provide the address server 10, roadside wireless devices 12, and the like is eliminated, and it is possible to reduce an infrastructure cost.

Figure 9:
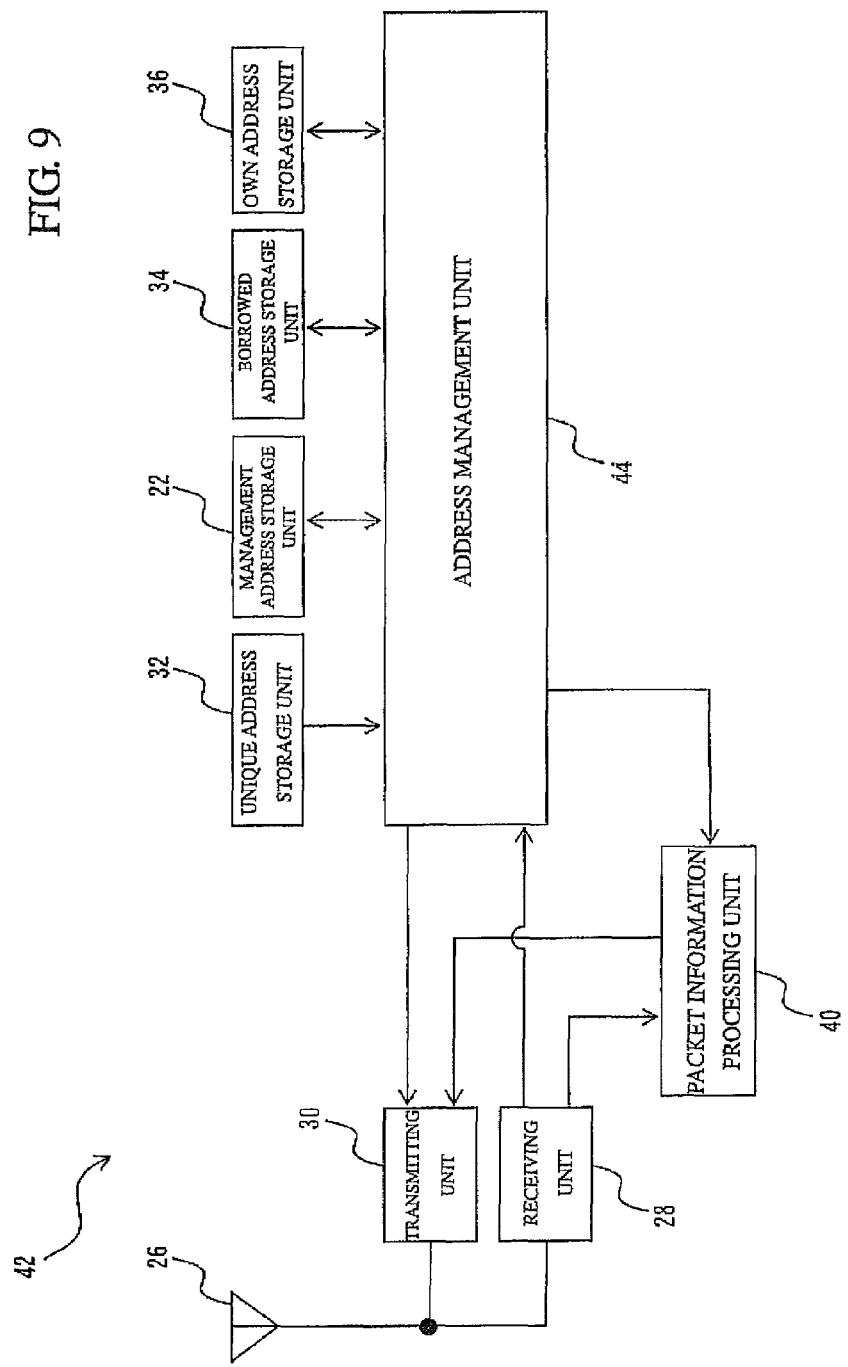
FIG. 9 A diagram showing a configuration of a vehicle-mounted communication apparatus according to the application example.

A configuration of a vehicle-mounted communication apparatus 42 according to the application example is shown in FIG. 9. The same components as those of the vehicle-mounted communication apparatus 14 of FIG. 4 will be given identical characters and numerals, and a simple description will be given of them. An address management unit 44 includes each configuration of the server side address management unit 24 of FIG. 1 and vehicle-mounted side address management unit 38 of FIG. 4, and executes each function. The vehicle-mounted communication apparatus 42, including the management address storage unit 22, manages management addresses as addresses to be assigned to other vehicle-mounted communication apparatus 14.

A description will be given, referring to FIGS. 2 and 3, of an address lending process executed by the vehicle-mounted communication apparatus 42. In the address lending process, the vehicle-mounted communication apparatus 42 transmits the management addresses stored in the management address storage unit 22 to other vehicle-mounted communication apparatus 42 as lent addresses. In the event that the vehicle-mounted communication apparatus 42 executes the address lending process, the address management unit 44 executes the same process as the process executed by the server side address management unit 24. Herein, it is taken that the number of addresses requested by one address borrowing process is one, and address request information which does not include the requested address quantity, is taken as an example. Apart from this kind of process, it is also acceptable to cause the requested address quantity to be included in the address request information, and to make the number of addresses requested by one address lending process plural.

The address lending process is started by receiving address request information transmitted from another vehicle-mounted communication apparatus 42 configuring the vehicle-to-vehicle communication system. The address request information includes information indicating the fact that an address lending is requested, an own address for identifying the vehicle-mounted communication apparatus 42 which has transmitted the relevant address request information, and information indicating a requested lending term determined by the other vehicle-to-vehicle communication apparatus 42 as a term for which a lent address is assigned.

The receiving unit 28 receives the address request information via the antenna 26, and outputs it to the address management unit 44. The address management unit 44, on acquiring the address request information, refers to the management table (S101).

When the lending term of a management address to which the identifier "lent" is correlated has expired, the address management unit 44 changes the identifier "lent" to the identifier "unused" (S102).

The address management unit 44 determines whether or not a management address, among the management addresses registered in the management table, to which the identifier "unused" is correlated is registered as the use condition information (S103). Then, when no management address to which the identifier "unused" is correlated is registered, the address management unit 44 finishes the address lending process.

Meanwhile, when a management address to which the identifier "unused" is correlated is registered as the use condition information, in the event that there area plurality of management addresses to which the identifier "unused" is correlated, the address management unit 44 selects one of them, and in the event that there is one management address to which the identifier "unused" is correlated, the address management unit 44 selects the management address as the lent address (S104).

The address management unit 44 determines a lending term, and generates lending term information indicating the lending term (S105). It is possible, based on the information indicating the requested lending term included in the received address request information, to determine the lending term to be the same term as the requested lending term.

The address management unit 44 correlates the identifier "lent", and the lending term information generated in step S105, to the management address which has been made the lent address, and registers them in the management table (S106).

The address management unit 44 generates address lending information which includes an address included in the address request information as a destination address, and which includes the lent address and lending term information, and outputs it to the transmitting unit 30 (S107). The transmitting unit 30 transmits the address lending information via the antenna 26.

According to this kind of process, when management addresses in the unused condition are registered in the management table, one of the management addresses is selected as a lent address for the vehicle-mounted communication apparatus 42 which is an address request source. Then, a lending term is determined for the lent address selected. By transmitting the address lending information including the lent addresses and lending term information, it is possible to allow the other vehicle-mounted communication apparatus 42 which has acquired the address lending information to acquire and use the lent address. Also, the lending term information is registered in the management table by step S106. Because of this, under the condition that the other vehicle-mounted communication apparatus 42 which has acquired the address lending information finishes the use of the lent address within the lending term, when the lending term has expired, it is possible to cancel the lent condition without carrying out communication with the relevant other vehicle-mounted communication apparatus 42 for confirming that the lending term has expired.

As the address request information, a description has been given here of a case in which the information including the information indicating the requested lending term has been acquired. The address lending process can also be executed in a case in which address request information which does not include the information indicating the requested lending term has been acquired.

In this case, the address management unit 44 determines the lending term in such a way that a time period from the current time to an expiration time of the lending term has a sufficient length for the vehicle-mounted communication apparatus 42 which is the address request source to carry out transmission and reception of the packet information, and is a short enough time period that it is difficult to track a path of movement of the vehicle-mounted communication apparatus 42 which is the address request source.

Also, it is preferable to make a time period until the lending term expires shorter as the frequency of assigning the management addresses to the other vehicle-mounted communication apparatus 42 becomes higher. For example, in the management table, the lending term is determined in such a way that, the larger the number of management addresses to which the identifier "lent" is correlated, the shorter the time period until the lending term expires. Also, it is acceptable to measure a frequency of the address request information being received, and determine the lending term in such a way that, the higher the relevant frequency, the shorter the time period until the lending term expires. Furthermore, it is also acceptable for an apparatus, such as a car navigation apparatus, which counts the number of other vehicles existing within a predetermined distance from a vehicle mounted with the vehicle-mounted communication apparatus 42 to be mounted on the vehicle-mounted communication apparatus 42, and for the lending term to be determined in such a way that, the larger the number of vehicles counted, the shorter the time period until the lending term expires. By determining the lending term in this way, it is possible to assign a large number of management addresses within a certain time period.

Furthermore, apart from determining the lending term in this way, it is also acceptable to take it that an average value of time periods for which a vehicle is driven is checked based on statistics on general vehicles, and that a lending term is determined in advance based on the average value.

Also, it is acceptable, when there are a plurality of management addresses to which the identifier "unused" is correlated, to execute in step S104 a process of preferentially selecting as the lent address a management address which has been placed in the unused condition for a long time. In this case, in the management table, a process is executed wherein a time period, which has elapsed from when the identifier "unused" has been correlated to the management address, is correlated to a management address to which the identifier "unused" is correlated, and the time period is registered in the management table every time the address lending process is executed. Also, it is acceptable in step S104, when there are a plurality of management addresses to which the identifier "unused" is correlated, to execute a process of preferentially selecting management addresses whose use condition has been changed to "lent" a small number of times. In this case, in the management table, a process is executed wherein the number of times the identifier "lent" has been correlated thereto is correlated to the individual management addresses, and the number of times is updated every time step S104 is executed. According to this kind of process, the individual management addresses registered in the management table are equally assigned to the other vehicle-mounted communication apparatus 42, and it is possible to increase the kinds of address used in the vehicle-to-vehicle communication system within a certain time period. By this means, it is possible to make it more difficult to track the vehicle-mounted communication apparatus 42.

The vehicle-mounted communication apparatus 42 transmits the management address to the other vehicle-mounted communication apparatus 42 as the lent address, while it acquires as the borrowed address the lent address transmitted from another vehicle-mounted communication apparatus 42, and applies the borrowed address as its own address for it to be identified in the vehicle-to-vehicle communication system.

A description will be given, referring to FIG. 5, of an address borrowing process wherein the vehicle-mounted communication apparatus 42 acquires a borrowed address. It is taken that the address borrowing process is executed when a condition is reached in which no borrowed address is stored in the borrowed address storage unit 34. Apart from this, it is preferable to execute the address borrowing process every time the heretofore described address lending process finishes. Also, it is acceptable to execute the address borrowing process every time a predetermined time period elapses, or every time a vehicle mounted with the vehicle-mounted communication apparatus 42 travels a predetermined distance.

The address management unit 44 generates address request information in which the own addresses stored in the own address storage unit 36 are caused to be included by the own address setting process. The address management unit 44 further determines terms, for which borrowed addresses are to be used, to be the requested lending terms, and causes information indicating the requested lending terms to be included in the address request information.

In the event that it is possible for each vehicle-mounted communication apparatus 42 configuring the vehicle-to-vehicle communication system to execute the address lending process for address request information which does not include the information indicating the requested lending terms, it is acceptable not to cause the information indicating the requested lending terms to be included in the address request information.

The lending term is determined in such a way that a time period from the current time to an expiration time of the lending term has a sufficient length for the vehicle-mounted communication apparatus 42, which is the address request source, to carry out transmission and reception of the packet information, and is a short enough time period that it is difficult to track the path of movement of the vehicle-mounted communication apparatus 42 which is the address request source. For example, the address management unit 44 acquires in advance an average value of time periods for which a vehicle mounted with the vehicle-mounted communication apparatus 42 which is the address request source is driven, that is, of time periods from turning on an ignition until turning it off, over a plurality of times of driving, and determines the time periods to be of around the average value.

Also, it is preferable to determine the requested lending term in such a way that the smaller the number of other vehicles around the vehicle mounted with the vehicle-mounted communication apparatus 42, the longer the time period until the relevant requested lending term expires. For example, a frequency of the address request information transmitted from another vehicle-mounted communication apparatus 42 being received is measured, and the requested lending term is determined in such a way that the lower the relevant frequency, the longer the time period until the requested lending term expires. Also, an apparatus which counts the number of other vehicles existing within a predetermined distance from the vehicle mounted with the vehicle-mounted communication apparatus 42 is mounted on the vehicle-mounted communication apparatus 42, and the requested lending term is determined in such a way that the smaller the number of other vehicles counted, the longer the time period until the requested lending term expires. By determining the requested lending term in this way, in the event that a frequency of other vehicles mounted with the vehicle-mounted communication apparatus 42 appearing in the vicinity is low, it is possible to extend the requested lending term, and lengthen a period for which the borrowed address can be used.

The address management unit 44 outputs the generated address request information to the transmitting unit 30 (S201). The transmitting unit 30 transmits the address request information via the antenna 26.

Address lending information is transmitted from another vehicle-mounted communication apparatus 42, which has received the address request information and responded to it, by the heretofore described address lending process. The receiving unit 28 receives the address lending information via the antenna 26, and outputs it to the address management unit 94.

The address management unit 44 acquires a lent address included in the address lending information as a borrowed address (S202). Also, it acquires lending term information included in the address lending information as use term information (S203). The address management unit 44 causes the borrowed address and use term information to be stored in the borrowed address storage unit 34 (S204). When the use term of the borrowed address stored in the borrowed address storage unit 34 expires, the address management unit 44 deletes the borrowed address and the use term information thereof from the borrowed address storage unit 34 (S205).

According to steps S201 to S204, the borrowed address and use term information are acquired from the received address lending information, and stored in the borrowed address storage unit 34. Also, according to step S205, it is possible to avoid the borrowed address whose use term has expired being referred to by the address management unit 44. By executing the address borrowing process a plurality of times, it is possible to cause a plurality of borrowed addresses to be stored in the borrowed address storage unit 34.

An own address setting process, wherein the address management unit 44 determines the own address, and causes it to be stored in the own address storage unit 36, is the same as the own address setting process executed by the vehicle-mounted side address management unit 38 of the vehicle-mounted communication apparatus 14. Also, a process of transmitting and receiving the packet information can also be executed in the same way as with the vehicle-mounted communication apparatus 14.

In the above, a description has been given of the vehicle-to-vehicle communication system, and the vehicle-mounted communication apparatus 14 and 42 configuring it, as the embodiment of the invention. The communication apparatus according to the invention can be applied to a wireless communication apparatus mounted on a mobile body such as a common mobile wireless apparatus or ship.

A correspondence relationship between the invention specified matters described in the claims and the components of the embodiment will be referred to. The correspondence relationship to be described here shall never limit the invention. It goes without saying that, with the invention, various embodiments are possible without departing from the scope thereof.

A borrowed address acquisition unit and a borrowing time period information acquisition unit correspond to the antenna 26, receiving unit 28, borrowed address storage unit 34, vehicle-mounted side address management unit 38, and the like in the vehicle-mounted communication apparatus 14, and to the antenna 26, receiving unit 28, borrowed address storage unit 34, address management unit 44, and the like in the vehicle-mounted communication apparatus 42. Also, a transmitting unit corresponds to the antenna 26, transmitting unit 30, own address storage unit 36, vehicle-mounted side address management unit 38, packet information processing unit 40, and the like in the vehicle-mounted communication apparatus 14, and to the antenna 26, transmitting unit 30, own address storage unit 36, address management unit 44, packet information processing unit 40, and the like in the vehicle-mounted communication apparatus 42.

A requested borrowing time period determination unit corresponds to the vehicle-mounted side address management unit 38 and the like in the vehicle-mounted communication apparatus 14, and to the address management unit 44 and the like in the vehicle-mounted communication apparatus 42. Also, an address request unit corresponds to the antenna 26, transmitting unit 28, vehicle-mounted side address management unit 38, and the like in the vehicle-mounted communication apparatus 14, and to the antenna 26, transmitting unit 28, address management unit 44, and the like in the vehicle-mounted communication apparatus 42.

A lent address storage unit corresponds to the management address storage unit 22 and the like in the address server 10, and to the address management unit 44 and the like in the vehicle-mounted communication apparatus 42. Also, a lending information supply unit corresponds to the roadside wireless devices 12, transmitting unit 20 in the address server 10, server side address management unit 24, and the like, and to the antenna 26, transmitting unit 28, address management unit 44, and the like in the vehicle-mounted communication apparatus 42.

An address request information acquisition unit and a lending time period determination unit correspond to the roadside wireless devices 12, receiving unit 18 in address server 10, server side address management unit 24, and the like, and to the antenna 26, receiving unit 28, address management unit 44, and the like in the vehicle-mounted communication apparatus 42.

The invention claimed is:

1. A mobile body-mounted communication apparatus which, being mounted on a mobile body, transmits and receives packet information, comprising:
a borrowed address acquisition unit which acquires a plurality of lent addresses, as a borrowed address group, from an address management apparatus which manages the lent addresses;
a borrowing time period information acquisition unit which acquires, from the address management apparatus, information indicating borrowing time periods defined as time periods for which the borrowed address group can be used;
a transmitting unit which transmits the packet information, which includes borrowed addresses included in the borrowed address group and information relating to the mobile body, for the borrowing time periods determined for the borrowed address group;
a requested borrowing time period determination unit which determines time periods for which the plurality of lent addresses are to be borrowed as the borrowed address group; and
an address request unit which transmits address request information which makes a request that the plurality of lent addresses be assigned for the time periods determined by the requested borrowing time period determination unit, wherein
the borrowed address acquisition unit acquires the plurality of lent addresses, as the borrowed address group, from the address management apparatus which has responded to the address request information, and
the borrowing time period information acquisition unit acquires the information indicating the borrowing time periods from the address management apparatus which has responded to the address request information.

2. An address management apparatus which assigns an address to a mobile body-mounted communication apparatus mounted on a mobile body, comprising:
a lent address storage unit which stores a lent address to be assigned to the mobile body-mounted communication apparatus;
a borrowing information supply unit which supplies the mobile body-mounted communication apparatus a lent address group including a plurality of the lent addresses, and information indicating lending time periods for which the lent address group is assigned to the mobile body-mounted communication apparatus;
an address request information acquisition unit which acquires, from the mobile body-mounted communication apparatus, address request information indicating time periods for which the lent address group is to be assigned; and
a lending time period determination unit which, based on the time periods indicated by the address request information, determines the lending time periods, wherein the lent address group is assigned to the mobile body-mounted communication apparatus for the lending time periods determined for the lent address group.

3. The address management apparatus according to claim 2,
wherein the address management apparatus is provided fixed in an area in which the mobile body moves.

4. An address management apparatus which assigns an address to a mobile body-mounted communication apparatus mounted on a mobile body, comprising:
a lent address storage unit which stores a lent address to be assigned to the mobile body-mounted communication apparatus; and
a borrowing information supply unit which supplies the mobile body-mounted communication apparatus a lent address group including a plurality of the lent addresses, and information indicating lending time periods for which the lent address group is assigned to the mobile body-mounted communication apparatus, wherein
a lending information supply unit includes lending time period determination means which, based on a frequency of assigning the lent address group to the mobile body-mounted communication apparatus, determines the lending time periods, and the lent address group is assigned to the mobile-body mounted communication apparatus for the lending time periods determined for the lent address group.

5. The address management apparatus according to claim 4, wherein the address management apparatus is provided fixed in an area in which the mobile body moves.

6. An address management apparatus which, being provided fixed in an area in which a mobile body moves, assigns an address to a mobile body-mounted communication apparatus, comprising:
   a lent address storage unit which stores a lent address to be assigned to the mobile body-mounted communication apparatus; and
   a lending information supply unit which supplies the mobile body-mounted communication apparatus the lent address and information indicating a lending time period for which the lent address is assigned to the mobile body-mounted communication apparatus, wherein
   the lent address is assigned to the mobile body-mounted communication apparatus for the lending time period determined for the lent address.

7. The address management apparatus according to claim 6, further comprising:
   an address request information acquisition unit which acquires, from the mobile body-mounted communication apparatus, address request information indicating a time period for which the lent address is to be assigned; and
   a lending time period determination unit which, based on the time period indicated by the address request information, determines the lending time period.

8. The address management apparatus according to claim 6, wherein
   the lending information supply unit includes lending time period determination means which, based on a frequency of assigning the lent address to the mobile body-mounted communication apparatus, determines the lending time period.

9. A mobile body-mounted communication apparatus which, being mounted on a mobile body, transmits and receives packet information, comprising:
   a borrowed address acquisition unit which acquires a lent address, as a borrowed address, from an address management apparatus which manages the lent address;
   a borrowing time period information acquisition unit which acquires, from the address management apparatus, information indicating a borrowing time period defined as a time period for which the borrowed address can be used;
   a transmitting unit which transmits the packet information, which includes the borrowed address and information relating to the mobile body, for the borrowing time period determined for the borrowed address;
   a requested borrowing time period determination unit which determines a time period for which the lent address is to be borrowed as the borrowed address; and
   an address request unit which transmits address request information which makes a request that the lent address be assigned for the time period determined by the requested borrowing time period determination unit, wherein
   the borrowed address acquisition unit acquires the lent address, as the borrowed address, from the address management apparatus which has responded to the address request information, and
   the borrowing time period information acquisition unit acquires the information indicating the borrowing time period from the address management apparatus which has responded to the address request information.

10. An address management apparatus which assigns an address to a mobile body-mounted communication apparatus mounted on a mobile body, comprising:
    a lent address storage unit which stores a lent address to be assigned to the mobile body-mounted communication apparatus;
    a lending information supply unit which supplies the mobile body-mounted communication apparatus the lent address and information indicating a lending time period for which the lent address is assigned to the mobile body-mounted communication apparatus;
    an address request information acquisition unit which acquires, from the mobile body-mounted communication apparatus, address request information indicating a time period for which the lent address is to be assigned; and
    a lending time period determination unit which, based on the time period indicated by the address request information, determines the lending time period, wherein
    the lent address is assigned to the mobile body-mounted communication apparatus for the lending time period determined for the lent address.

11. An address management apparatus which assigns an address to a mobile body-mounted communication apparatus mounted on a mobile body, comprising:
    a lent address storage unit which stores a lent address to be assigned to the mobile body-mounted communication apparatus; and
    a lending information supply unit which supplies the mobile body-mounted communication apparatus the lent address and information indicating a lending time period for which the lent address is assigned to the mobile body-mounted communication apparatus, wherein
    the lending information supply unit includes lending time period determination means which, based on a frequency of assigning the lent address to the mobile body-mounted communication apparatus, determines the lending time period, and the lent address is assigned to the mobile body-mounted communication apparatus for the lending time period determined for the lent address.

* * * * *